United States Patent
Fleischhacker

(10) Patent No.: US 10,773,650 B2
(45) Date of Patent: Sep. 15, 2020

(54) PASSENGER MOTOR VEHICLE LUGGAGE COMPARTMENT COVER

(71) Applicant: Dr. Ing. h.c. F. Porsche Aktiengesellschaft, Stuttgart (DE)

(72) Inventor: Robert Fleischhacker, Tiefenbronn-Muehlhausen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 195 days.

(21) Appl. No.: 15/955,700

(22) Filed: Apr. 18, 2018

(65) Prior Publication Data
US 2018/0319343 A1 Nov. 8, 2018

(30) Foreign Application Priority Data
May 4, 2017 (DE) .................. 10 2017 109 526

(51) Int. Cl.
*B60R 5/04* (2006.01)
(52) U.S. Cl.
CPC .................... *B60R 5/045* (2013.01)
(58) Field of Classification Search
CPC ........... B60R 5/045; B60R 5/04; B62D 25/12; B62D 25/10
USPC ................ 296/37.16, 37.1, 76, 37.5, 24.44
See application file for complete search history.

(56) References Cited

U.S. PATENT DOCUMENTS

| 2,803,490 | A | * | 8/1957 | Ehret | A61G 3/001 296/16 |
| 3,393,936 | A | * | 7/1968 | Hall | B60R 5/045 296/24.44 |
| 4,127,301 | A | * | 11/1978 | Syrowik | B60R 5/044 296/37.16 |
| 6,231,096 | B1 | * | 5/2001 | Bollmann | B60R 5/045 296/100.06 |
| 7,641,256 | B2 | * | 1/2010 | Kodaira | B60R 5/048 296/37.1 |
| 8,696,044 | B2 | * | 4/2014 | Kim | B60R 5/045 296/24.43 |
| 2006/0108817 | A1 | * | 5/2006 | DeLong | B60R 5/04 296/24.43 |
| 2013/0147226 | A1 | * | 6/2013 | Cao | B60R 5/045 296/37.16 |

(Continued)

FOREIGN PATENT DOCUMENTS

DE 19846823 C2 5/2002
DE 102005045358 A1 4/2007

*Primary Examiner* — Jason S Morrow
*Assistant Examiner* — E Turner Hicks
(74) *Attorney, Agent, or Firm* — Leydig, Voit & Mayer, Ltd.

(57) ABSTRACT

A passenger motor vehicle luggage compartment cover for a passenger motor vehicle is configured to optionally covering the luggage compartment. The luggage compartment cover includes at least one rigid luggage compartment lid which can be moved between a substantially horizontal closed position and an upright lateral parked position; and at least one stationary guide rail on which a guide element of the luggage compartment lid is guided. The luggage compartment lid is configured to be displaced between the horizontal closed position and the upright lateral parked position in a vehicle transverse direction and in the process can be pivoted with respect to a vehicle longitudinal axis.

13 Claims, 2 Drawing Sheets

(56) References Cited

U.S. PATENT DOCUMENTS

2015/0283949 A1\* 10/2015 V ................... B60R 13/0268
296/24.43

\* cited by examiner

PASSENGER MOTOR VEHICLE LUGGAGE COMPARTMENT COVER

CROSS REFERENCE TO RELATED APPLICATIONS

This application claims benefit to German Patent Application No. DE 10 2017 109 526.8, filed May 4, 2017, which is hereby incorporated by reference herein.

FIELD

The invention relates to a luggage compartment cover for a passenger motor vehicle in a vehicle body construction with a contiguous passenger and luggage compartment which together form the passenger motor vehicle interior space.

BACKGROUND

A passenger motor vehicle with a contiguous passenger and luggage compartment can also be referred to as a "station wagon", and is distinguished, in particular, by the fact that the luggage compartment is not separated completely from the passenger compartment. The lower part of the luggage compartment can frequently be closed off as required by way of a luggage compartment cover. A passenger motor vehicle luggage compartment cover of this type is known from DE 198 46 823 C2. The luggage compartment cover consists of two pivoting covers which cover the luggage compartment at a defined spacing from the luggage compartment floor in an approximately horizontal closed position. The pivot axes of the pivoting covers extend in each case parallel to the vehicle longitudinal direction and are formed in each case by way of a pivoting hinge which is arranged on the relevant vehicle side wall. The pivoting covers can be pivoted upward into an inclined open position. The opening angle of the two pivoting covers is dependent on the height of the luggage compartment, and is as a rule at most 90°, with the result that the pivoting covers partially block the upper part of the luggage compartment in the open position.

SUMMARY

In an embodiment, the present invention provides a passenger motor vehicle luggage compartment cover for a passenger motor vehicle having an interior compartment which comprises a luggage compartment and a passenger compartment. The luggage compartment cover is configured to optionally covering the luggage compartment. The luggage compartment cover includes at least one rigid luggage compartment lid which can be moved between a substantially horizontal closed position and an upright lateral parked position; and at least one stationary guide rail on which a guide element of the luggage compartment lid is guided so that the luggage compartment lid is displaceable between the horizontal closed position and the upright lateral parked position in a vehicle transverse direction and in the process can be pivoted with respect to a vehicle longitudinal axis.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
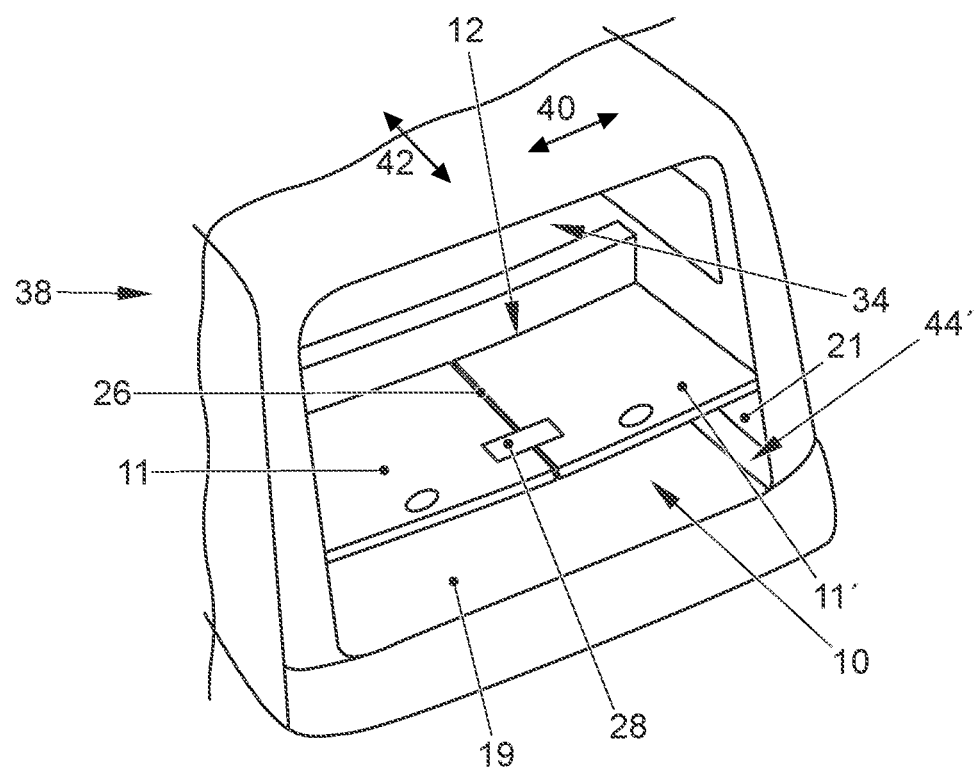
FIG. 1 shows a perspective view of a passenger motor vehicle rear having a luggage compartment cover which consists of two luggage compartment lids which are situated in the closed position.

Embodiments of the invention provide a passenger motor vehicle luggage compartment cover which is not an obstacle in its open position.

A passenger motor vehicle luggage compartment cover according to one or more embodiments of the invention has at least one rigid luggage compartment lid which can be displaced between a substantially horizontal closed position and a non-horizontal parked position. The luggage compartment lid is not configured as a flexible curtain web, but rather consists of a rigid and inherently stable luggage compartment lid body. The luggage compartment lid is guided in at least one stationary guide rail which is fixed on the passenger motor vehicle body in an immovable manner. To this end, the luggage compartment lid has at least one guide element which is guided and runs in the guide rail. The luggage compartment lid is positively guided by way of the at least one guide element between a horizontal closed position and an upright lateral parked position. Here, the luggage compartment lid is displaced and also pivoted in the vehicle transverse direction and vertically. An upright lateral parked position is not necessarily to be understood to mean a perpendicular parked position, but rather a parked position, in which the luggage compartment lid stands with a perpendicular component in space. In the lateral parked position, the luggage compartment lid stands close to and approximately parallel to the relevant passenger motor vehicle sidewall. By virtue of the fact that the luggage compartment lid is displaced downward during the displacement into the parked position, the luggage compartment lid can be pivoted completely onto the relevant passenger motor vehicle side wall even when the height of the luggage compartment is not great.

In this way, a passenger motor vehicle luggage compartment cover is realized which is stowed in a compact manner in its parked position and does not block the luggage compartment.

The luggage compartment lid is preferably positioned in the closed position substantially parallel to and at a defined horizontal spacing from the luggage compartment floor. The luggage compartment floor as a rule lies approximately in a horizontal plane, with the result that the luggage compartment lid also lies substantially in a horizontal plane in its closed position.

According to one preferred embodiment, the luggage compartment lid stands in its parked position substantially parallel to the adjacent luggage compartment side wall. Very compact and space-saving storage of the luggage compartment lid in its parked position is possible in this way. The lateral spacing of the parked luggage compartment lid from the associated luggage compartment side wall is particularly preferably not more than a few centimeters at any point. The luggage compartment side wall and the luggage compartment lid can be adapted to one another with regard to their shape in this region. Here, the luggage compartment side wall and the luggage compartment lid do not necessarily have to be completely planar.

The luggage compartment lid preferably has a distal guide element which is guided predominantly vertically and tightly on the associated luggage compartment side wall during the displacement between the closed position and the parked position. The distal guide element of the luggage compartment lid is to be understood to mean a guide element which is provided on the outer side of the luggage compartment lid, in relation to the passenger motor vehicle longitudinal axis, in the case of the closed luggage compartment lid. In the parked position, the distal guide element is in its lowest position.

A proximal guide element is particularly preferably additionally provided on the luggage compartment lid, which proximal guide element is guided predominantly horizontally during the displacement. A linear/pivoting movement of the luggage compartment lid which can in principle be defined freely in structural terms is fixed and defined by way of the interaction of the distal and the proximal guide element in a stationary guide rail or in two separate stationary guide rails.

Two luggage compartment lids which are separate from one another are preferably provided, which are separated from one another by way of a dividing gap in the closed position. Each of the two luggage compartment lids can be displaced and positioned independently of one another. The dividing gap runs substantially centrally in the vehicle longitudinal direction.

According to one preferred refinement, a mechanical luggage compartment lid locking means is provided, by way of which the luggage compartment lids can be connected to one another in the closed position to form a fixed flat structure. The two luggage compartment lids are connected rigidly to one another by way of the locked luggage compartment lid locking means, such that a stable platform is formed as a result, on which cargo can be deposited.

A latching means is preferably provided, by way of which the luggage compartment lid can be latched releasably in an intermediate position between its parked position and its closed position. This is appropriate, for example, when a relatively large piece of cargo is to be clamped between the two abutment sides of the luggage compartment lid, in order to secure the cargo piece and, in particular, to fix it in relation to transverse movements. Corresponding clamping bodies can serve, for example, as locking means, which clamping bodies are clamped into the guide rail, in order to block an opening movement of the relevant luggage compartment lid in the desired intermediate position. The latching means can also be an integrated clamping mechanism which is easy to operate and has, for example, clamping jaws or brake blocks which are fastened to the luggage compartment lids and can be clamped fixedly via a clamping mechanism in the guide rail.

According to one preferred refinement, a receiving pocket is provided in the luggage compartment floor, which receiving pocket receives a distal section of the luggage compartment lid in its parked position. The distal section of the luggage compartment lid is to be understood to mean that side of the luggage compartment lid which, in the closed position, does not terminate the luggage compartment lid toward the center, but rather laterally toward the outside on the side. Said section dips into the lateral receiving pocket in the parked position of the luggage compartment lid. In this way, the luggage compartment lid can be pushed further downward into its parked position than the luggage compartment floor would permit without a receiving pocket. The luggage compartment lid is lowered partially at any rate. For example, the luggage compartment lid can be lowered into its parked position in this way so deeply that side windows in the region of the luggage compartment are not concealed by way of the luggage compartment lid.

FIGS. 1-4 show the rear of a passenger motor vehicle 38 with an open rear door 46. The passenger motor vehicle 38 has a vehicle longitudinal direction 42 and a vehicle transverse direction 40, the two directions 40, 42 relating in each case to the straight ahead driving direction of the passenger motor vehicle 38.

The passenger motor vehicle 10 is what is known as a station wagon and has a single interior space 32 which is divided functionally into a front passenger compartment 34 and a rear luggage compartment 10. There is no closed dividing wall between the passenger compartment 34 and the luggage compartment 10. The luggage compartment 10 is delimited downward by way of a substantially planar luggage compartment floor 19 which lies in a horizontal plane, and is delimited in each case laterally by way of two luggage compartment side walls 21. Windows are provided in the side walls 21, through which windows the luggage compartment 10 can be viewed from the outside.

A passenger motor vehicle luggage compartment cover 12 is arranged in the luggage compartment 10, by way of which passenger motor vehicle luggage compartment cover 12 the lower part of the luggage compartment 10 can be closed on the upper side if required. The luggage compartment cover 11 has two rigid plastic luggage compartment lids 11, 11' which are both shown in the closed position in FIG. 1. Furthermore, the luggage compartment cover 12 has in each case two upright guide rails 16, 16', 17' and in each case one horizontal guide rail 15, 15' in the left-hand and the right-hand vehicle half. In each case one corresponding guide element 23, 23', 24, 24', 25' is guided displaceably in each of the three guide rails 15, 15', 16, 16', 17' of a vehicle half, which guide element 23, 23', 24, 24', 25' is fastened to the relevant luggage compartment lid 11, 11'. Each luggage compartment lid 11, 11' is guided in a clear and defined manner on the guide rails 15, 15', 16, 16', 17' by three guide elements 23, 24, 23', 24', 25' of the relevant luggage compartment lid 11, 11'. As can be seen clearly in FIG. 3, the guide rails 15, 15', 16, 16', 17' have an undercut profile with a C-shaped cross section, in which profile in each case one mushroom-shaped guide element 23, 23', 24, 24', 25' is guided captively.

Figure 2:
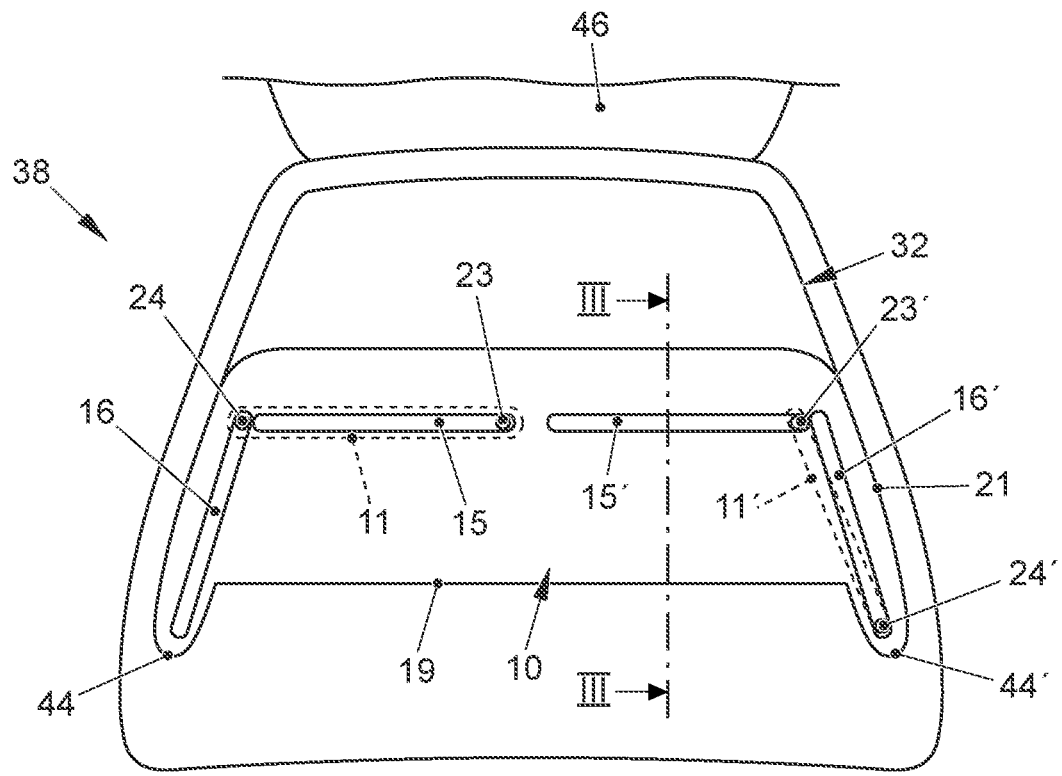
FIG. 2 shows the luggage compartment cover from FIG. 1 in cross section with one luggage compartment lid in the closed position and one luggage compartment lid in the parked position.
Figure 3:
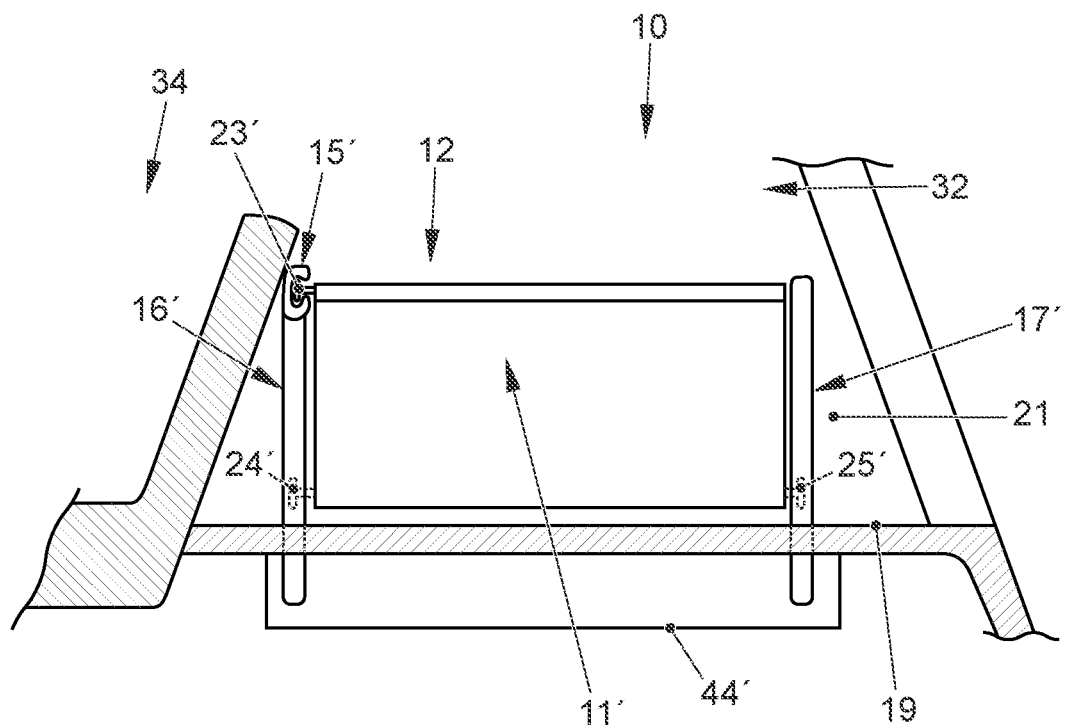
FIG. 3 shows the luggage compartment cover from FIG. 2 in the longitudinal section with one luggage compartment lid in an intermediate position.

As shown in FIG. 2, a rear door 46 of the passenger motor vehicle 38 is open, and the luggage compartment lid 11, 11' can be displaced between a closed position, as shown in the left-hand vehicle half, and a parked position, as shown in the right-hand vehicle half. In the closed position which is shown on the left in FIG. 2, the luggage compartment lid 11 is positioned substantially parallel to the luggage compartment floor 19 and at a defined horizontal spacing from the luggage compartment floor 19. In the lateral and upright parked position which is shown on the right in FIG. 2, the luggage compartment lid 11' is oriented approximately parallel to the adjacent luggage compartment side wall 21.

In the present case, an approximately parallel orientation is understood to mean a deviation of less than 20% between the base plane of the luggage compartment lid 11' in the parked position and the associated side wall 21. An upright lateral parked position is to be understood to mean a position and orientation of the luggage compartment lid 11' which has an appreciable vertical component, but can certainly be inclined to a greater or lesser extent toward the center, for example can be inclined in the direction of the passenger motor vehicle center by up to 35° with respect to the vertical.

In each case one receiving pocket 44, 44' which is let downward into the luggage compartment floor 19 and extends over the length of the luggage compartment cover 20 is provided on the two edge sides of the luggage compartment floor 19. The relevant distal edge region of the luggage compartment lid 11, 11' dips into the two luggage compartment pockets 44, 44' in its parked position, as shown in the right-hand passenger motor vehicle half in FIG. 2.

In the closed position of the two luggage compartment lids 11, 11' which is shown in FIG. 1, an unavoidable dividing gap 26 remains between the two abutment sides of the luggage compartment lids 11, 11' which face one another, by way of which dividing gap 26 the two luggage compartment lids 11, 11' are separated from one another. A mechanical luggage compartment lid locking means 28 is provided, by way of which the two luggage compartment lids 11, 11' are connected rigidly to one another in the closed position to form a fixed flat structure. The luggage compartment lid locking means 28 can be configured, for example, as a sliding bar. The locking action which is established in this way stiffens the two luggage compartment lids with respect to one another in such a way that a fixed, stable and rigid flat structure is formed as a result, onto which flat structure cargo can be deposited and stowed.

Figure 4:
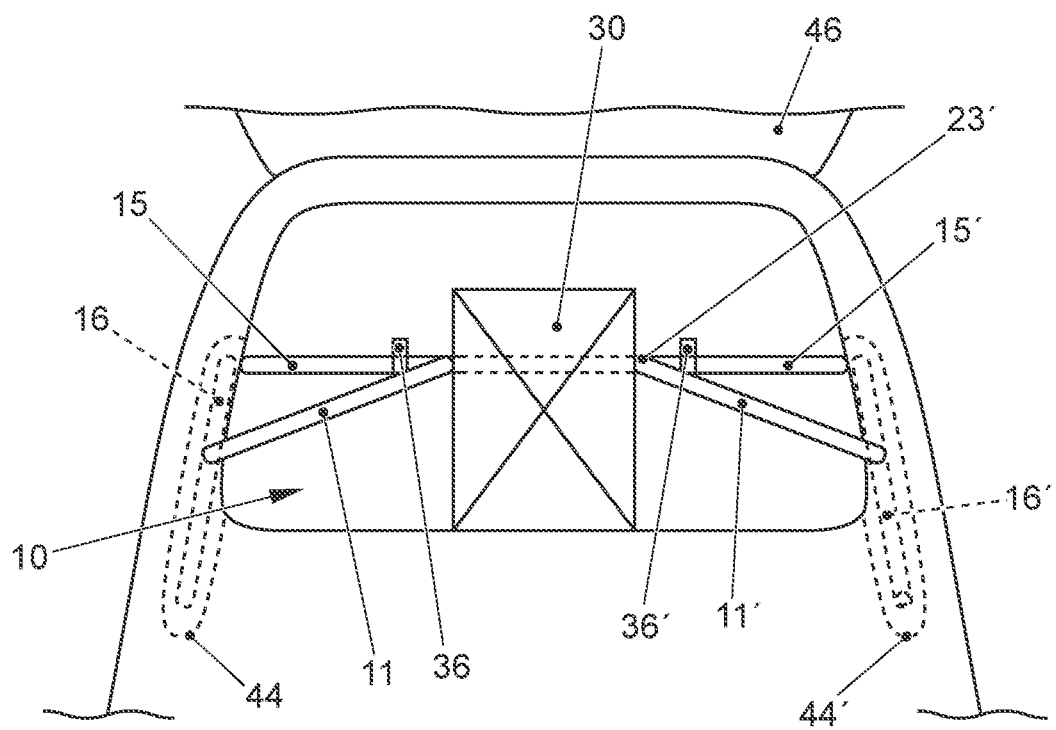
FIG. 4 shows the luggage compartment lid from FIG. 1 with the two luggage compartment lids which are latched in an intermediate position.

FIG. 4 shows the two luggage compartment lids 11, 11' in a latched state in an intermediate position. In each case latching means 36, 36', for example clamping means, serve for this purpose, which latching means 36, 36' are plugged and fixed into the relevant guide rail 15, 15' in such a way that the two luggage compartment lids 11, 11' are blocked at any rate in the opening direction in the relevant intermediate position. A piece of cargo 30 can be fixed in this way, as shown in FIG. 4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A passenger motor vehicle luggage compartment cover for a passenger motor vehicle having an interior compartment which comprises a luggage compartment and a passenger compartment, the luggage compartment cover configured to optionally covering the luggage compartment, the luggage compartment cover comprising:
    at least one rigid luggage compartment lid which can be moved between a substantially horizontal closed position and an upright lateral parked position; and
    at least one stationary guide rail on which a guide element of the luggage compartment lid is guided so that the luggage compartment lid is displaceable between the horizontal closed position and the upright lateral parked position in a vehicle transverse direction and in the process can be pivoted with respect to a vehicle longitudinal axis.

2. The passenger motor vehicle luggage compartment cover as claimed in claim 1, wherein the luggage compartment lid is, in the closed position, positioned substantially parallel to and at a defined horizontal spacing from the luggage compartment floor.

3. The passenger motor vehicle luggage compartment cover as claimed in claim 1, wherein the luggage compartment lid, is, in the upright lateral parked position, substantially parallel to an adjacent luggage compartment side wall.

4. The passenger motor vehicle luggage compartment cover as claimed in claim 1, further comprising a distal guide element provided on the luggage compartment lid, wherein the distal guide element is guided vertically in a guide rail on the associated luggage compartment side wall during the displacement between the closed position and the parked position.

5. The passenger motor vehicle luggage compartment cover as claimed in claim 1, further comprising a proximal guide element being provided on the luggage compartment lid, wherein the proximal guide element is guided predominantly horizontally during the displacement.

6. The passenger motor vehicle luggage compartment cover as claimed in claim 1, wherein the luggage compartment cover includes two luggage compartment lids which are separated from one another by way of a dividing gap in the closed position, wherein each of the luggage compartment lids is configured to be displaced independently of one another.

7. The passenger motor vehicle luggage compartment cover as claimed in claim 6, wherein the dividing gap is arranged approximately centrally in the vehicle and runs substantially in the vehicle longitudinal direction.

8. The passenger motor vehicle luggage compartment cover as claimed in claim 6, wherein a mechanical luggage compartment lid lock is provided, by way of which the two luggage compartment lids can be connected to one another in the closed position to form a fixed flat structure.

9. The passenger motor vehicle luggage compartment cover as claimed in claim 1, further comprising a latch by way of which the luggage compartment lid can be latched releasably in an intermediate position between the parked position and the closed position.

10. The passenger motor vehicle luggage compartment cover as claimed in claim 1, further comprising a receiving pocket in a luggage compartment floor, wherein the receiving pocket is configured to receive a distal section of the luggage compartment lid in the parked position.

11. The passenger motor vehicle luggage compartment cover as claimed in claim 1, wherein the at least one guide rail comprises a portion extending in a horizontal direction and a portion extending in a vertical direction.

12. The passenger motor vehicle luggage compartment cover as claimed in claim 1, wherein the luggage compartment lid comprises at least one guide element configured to engage with the at least one guide rail to guide the movement of the luggage compartment lid in a horizontal direction and a vertical direction.

13. The passenger motor vehicle luggage compartment cover as claimed in claim 1, wherein the at least one guide element is mushroom shaped, wherein the at least one guide rail has an undercut profile with a C-shaped cross section, and wherein the at least one guide element is guided captively in the at least one guide rail.

* * * * *